(12) United States Patent
Davis

(10) Patent No.: US 11,319,807 B2
(45) Date of Patent: May 3, 2022

(54) FRACTURE CONFIGURATION USING A KALMAN FILTER

(71) Applicant: Halliburton Energy Services, Inc., Houston, TX (US)

(72) Inventor: Eric James Davis, El Cerrito, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 237 days.

(21) Appl. No.: 16/651,135

(22) PCT Filed: Dec. 12, 2017

(86) PCT No.: PCT/US2017/065868
§ 371 (c)(1),
(2) Date: Mar. 26, 2020

(87) PCT Pub. No.: WO2019/117875
PCT Pub. Date: Jun. 20, 2019

(65) Prior Publication Data
US 2020/0291775 A1     Sep. 17, 2020

(51) Int. Cl.
| | |
|---|---|
| *E21B 43/26* | (2006.01) |
| *E21B 49/00* | (2006.01) |
| *E21B 47/07* | (2012.01) |
| *E21B 47/06* | (2012.01) |
| *G01V 1/28* | (2006.01) |

(52) U.S. Cl.
CPC ............. *E21B 49/00* (2013.01); *E21B 43/26* (2013.01); *E21B 47/06* (2013.01); *E21B 47/07* (2020.05); *G01V 1/288* (2013.01); *E21B 2200/20* (2020.05); *G01V 2210/1234* (2013.01); *G01V 2210/646* (2013.01)

(58) Field of Classification Search
CPC ........................................................ E21B 43/26
See application file for complete search history.

(56) References Cited

U.S. PATENT DOCUMENTS

| | | | |
|---|---|---|---|
| 7,584,081 B2 * | 9/2009 | Wen ........................ | E21B 43/00 703/2 |
| 7,660,711 B2 | 2/2010 | Pita et al. | |
| (Continued) | | | |

FOREIGN PATENT DOCUMENTS

WO     2015175053 A2     11/2015

OTHER PUBLICATIONS

PCT Application Serial No. PCT/US2017/065868, International Search Report, dated Sep. 4, 2018, 3 pages.

(Continued)

*Primary Examiner* — Kenneth L Thompson
(74) *Attorney, Agent, or Firm* — DeLizio, Peacock, Lewin & Guerra

(57) ABSTRACT

Treatment fluid may be injected into a wellbore of a geological formation to stimulate fracturing of the geological formation. A plurality of measurements may be received from one or more sensors on a surface of the geological formation or downhole which measures an indication of change of the geological formation based on the stimulation. A fracture configuration of a fracture in the geological formation may be determined based on an Kalman gain and the plurality of measurement data. Injection of the treatment fluid into the wellbore may be adjusted based on the fracture configuration.

20 Claims, 7 Drawing Sheets

(56) References Cited

U.S. PATENT DOCUMENTS

| | | | | |
|---|---|---|---|---|
| 8,594,818 | B2* | 11/2013 | Boe | E21B 43/00 700/95 |
| 9,031,822 | B2* | 5/2015 | Sarma | G06F 30/20 703/10 |
| 10,125,586 | B2* | 11/2018 | Balan | E21B 43/162 |
| 10,545,260 | B2* | 1/2020 | Hu | G01V 99/005 |
| 10,664,634 | B2* | 5/2020 | Gentilhomme | G06F 30/20 |
| 10,922,451 | B2* | 2/2021 | Lee | E21B 43/00 |
| 2002/0013687 | A1* | 1/2002 | Ortoleva | G01V 11/00 703/10 |
| 2008/0164021 | A1 | 7/2008 | Dykstra | |
| 2011/0042080 | A1 | 2/2011 | Birchwood et al. | |
| 2016/0230513 | A1 | 8/2016 | Dykstra et al. | |
| 2017/0234999 | A1 | 8/2017 | Dykstra et al. | |
| 2021/0149077 | A1* | 5/2021 | Zagayevskiy | G06N 20/20 |

OTHER PUBLICATIONS

PCT Application Serial No. PCT/US2017/065868, Written Opinion, dated Sep. 4, 2018, 11 pages.

Chen, et al., "Tilt Monitoring of Hydraulic Fracture Preconditioning Treatments", ARMA 09-100, American Rock Mechanics Association, 43rd US Rock Mechanics Symposium, Asheville, North Carolina, 2009, 7 pages.

Okada, "Internal Deformation Due to Shearand Tensile Faults in a Half-Space", Bulletin of the Seismological Society of America, vol. 82 No. 2, Apr. 1992, pp. 1018-1040.

Terejanu, "Extended Kalman Filter Tutorial", 2008, Department of Computer Science & Engineering, University of Buffalo, 7 pages, accessed from https://homes.cs.washington.edu/~todorov/courses/cseP590/readings/tutorialEKF.pdf.

Welch, et al., "An Introduction To the Kalman Filter", TR 95-041, Department of Computer Science, University of North Carolina Chapel Hill, Jul. 2006, 16 pages.

* cited by examiner

FRACTURE CONFIGURATION USING A KALMAN FILTER

TECHNICAL FIELD

The disclosure generally relates to the field of hydrocarbon production, and more particularly to using a Kalman filter to determine a fracture configuration in a geological formation as a result of stimulation treatment.

BACKGROUND ART

Hydraulic fracture stimulation is a process of injecting treatment fluid, often mixed with stimulation additives such as particulates, into a wellbore of a geological formation under high pressure. The injected treatment fluid initiates and propagates fractures below a surface of the geological formation (i.e., subsurface formation) to a desired extent to facilitate extraction of hydrocarbons.

The fracturing process can not only cause fracturing of the subsurface formation but also movement and other effects that can be detected by sensors. Measured data from sensors such as tiltmeters both on a surface of the Earth and subsurface in a wellbore, geophones, temperature sensors and flow sensors also in the wellbore can be inverted through an inversion process to develop a plurality of models to predict a fracture configuration. Not all the models provided by the inversion process are an accurate predictor of the fracture configuration. As a result, the plurality of models are compared to the measured data to identify the model of the plurality of models which best predicts the fracture configuration.

BRIEF DESCRIPTION OF THE DRAWINGS

Embodiments of the disclosure may be better understood by referencing the accompanying drawings.

DESCRIPTION OF EMBODIMENTS

Figure 1:
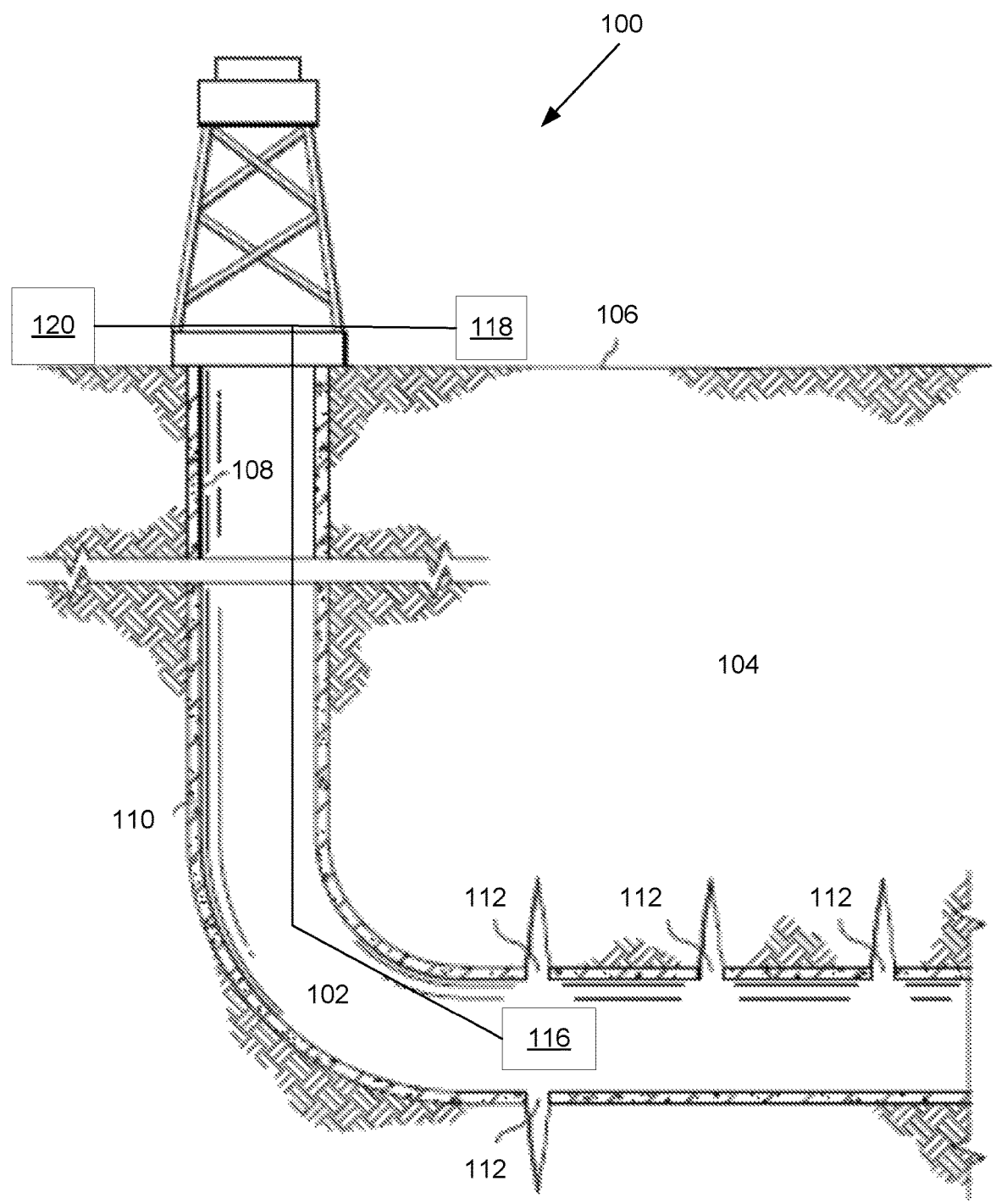
FIG. 1 is a diagram of an illustrative well system arranged with apparatus for determining a fracture configuration of a fracture in a subsurface formation.

Embodiments described herein are directed to a method, system, and apparatus for predicting a fracture configuration associated with a fracture of a subsurface formation during stimulation of the subsurface formation. The fracture configuration may be determined using an iterative extended Kalman filter which is modified to account for non-linearities in one or more constitutive models associated with the fracturing process. The modified iterative extended Kalman filter is an algorithm that uses a series of measurements observed over time, containing statistical noise and other inaccuracies, to produce estimates of unknown variables. The estimates of the unknown variables in the disclosed embodiments may be the fracture configuration associated with a fracture.

The modified iterative extended Kalman filter may involve defining a state vector and measurement vector. The state vector may comprise one or more state variables that define the fracture configuration. The state variable may be initially set based on a model of the fracturing process. Each state variable may be indictive of a fracture parameter such as a lateral length of the fracture, volume, net pressure, or offset of the fracture. A measurement vector may comprise one or more measurements from the one or more sensors indicative of movement of the subsurface formation provided by the one or more sensors. For example, one measurement may be associated with a tilt sensor while another measurement may be associated with a distributed acoustic sensor (DTS). The modified iterative extended Kalman filter may involve updating the state vector based on the measurement vector and an estimate of the measurement vector weighted by a Kalman gain. The Kalman gain may indicate a level of "trust" between the measurement vector and the estimate of the measurement vector in updating the state vector. The Kalman gain may be calculated based on a Jacobian which indicates how a given measurement of the measurement vector is expected to change as a given state variable of the state vector changes in the presence of non-linearities associated with the fracturing process. The determination of the Jacobian may involve identifying a global minimum associated with a nonlinear function that relates the measurement vector and the state vector.

Further, in some embodiments, the Kalman gain may be adjusted to ensure that the state variables associated with the state vector indicative of the fracture configuration are physically reasonable. For example, a length of a fracture cannot be less than zero. The state vector may be further updated as additional measurement vectors are received from the one or more sensors. The fracture configuration defined by the updated state vector may be used in various ways including further stimulation of the subsurface formation.

The description that follows includes example systems, apparatuses, and methods that embody aspects of the disclosure. However, it is understood that this disclosure may be practiced without these specific details. For instance, this disclosure refers to determining fracture parameters in subsurface formations for hydrocarbon production in illustrative examples. Aspects of this disclosure can be also applied to any other applications requiring determination of characteristics of subsurface deformations. In other instances, well-known instructions, structures and techniques have not been shown in detail in order not to obfuscate the description.

Example Illustrations

FIG. 1 is a diagram illustrating an example of a well system 100. As shown in the example of FIG. 1, well system 100 includes a wellbore 102 in a subsurface formation 104 beneath a surface 106 of a wellsite. Wellbore 102 as shown in the example of FIG. 1 includes a horizontal wellbore. However, it should be appreciated that embodiments are not limited thereto and that well system 100 may include any combination of horizontal, vertical, slant, curved, and/or other wellbore orientations. The subsurface formation 104 may include a reservoir that contains hydrocarbon resources, such as oil, natural gas, and/or others. For example, the subsurface formation 104 may be a rock formation (e.g., shale, coal, sandstone, granite, and/or others) that includes hydrocarbon deposits, such as oil and natural gas. In some cases, the subsurface formation 104 may be a tight gas formation that includes low permeability rock (e.g., shale, coal, and/or others). The subsurface formation 104 may be composed of naturally fractured rock and/or natural rock formations that are not fractured initially to any significant degree.

In some examples, the wellbore 102 may be lined with a casing 108 and cement 110. The wellbore may also have entry points 112 into the subsurface formation 104. The entry points 112 may provide fluid communication between the wellbore 102 and the subsurface formation 104. The entry points 112 may be formed in a variety of manners including deploying perforation guns downhole which blast entry points into one or more of the casing 108, cement 110, and subsurface formation 104 via controlled explosions.

The communication between the wellbore 102 and the subsurface formation 104 via the entry points 112 may facilitate stimulation of the subsurface formation 104. Stimulation is a process of injecting treatment fluid, e.g., hydraulic fluid mixed with stimulation additives (e.g., particulates) down the wellbore 102 under high pressure. The treatment fluid under high pressure may enter the entry points 112 and cause fracturing 114 of the subsurface formation 104. The fracturing creates high-conductivity fluid communication with a large area of subsurface formation 104 to the wellbore 102 to facilitate hydrocarbon extraction.

Further, the fracturing may cause the subsurface formation to move. The movement may be very small, e.g., 1/10 of an inch over 10 feet, but this small movement can be analyzed to determine a fracture configuration. For example, sensors can be employed to detect this movement. The sensors may take a variety of forms.

In one example, the sensors may be downhole sensors 116. For example, the downhole sensors 116 may include fiber-optic sensors of a distributed acoustic sensing (DAS), distributed strain sensing, and/or distributed temperature sensing (DTS) subsystems disposed within the wellbore. Flow distribution of the hydraulic fluid based on analysis of measurements of acoustic intensity and temporal heat collected by DAS and DTS fiber-optic sensors respectively may be indicative of the movement. A change in strain on a distributed strain sensing subsystem may be indicative of the movement. As another example, the downhole sensors 116 may include downhole micro-seismic sensors such as geophones located in a nearby wellbore, which measure microseismic events within the surrounding subsurface formation along the path of the wellbore indicative of this movement. As another yet example, the downhole sensors 116 may include pressure sensors which measure pressure changes of the hydraulic fluid flowing in the wellbore 102. The pressure changes may be indicative of this movement. As another example, the downhole sensors 116 may include a downhole tiltmeter which output a tilt measurement indicative of very small motions, such as that of the casing 108. The movement of the casing 108 may be indicative of the movement of the subsurface formation 104. The downhole sensors 116 may take other forms as well.

In another example, the sensors may be surface sensors 118. The surface sensors 118 may take the form of one or more tiltmeters on the surface of the subsurface formation 104 rather than downhole. The surface sensors 118 may output a tilt measurement indicative of very small changes from the vertical level, either on the ground or in structures. The surface sensors 118 may take other forms as well.

One or more of the downhole sensors 116 and surface sensors 118 may be communicatively coupled to a data processing unit 120. The data processing unit 120 may be located at the surface 106 (as shown) or downhole. The data processing unit 120 may receive and process the measurements received by the downhole sensors 116 and surface sensor 118 to determine the movement of the formation due to the stimulation treatment.

Embodiments described herein are directed to a method, system, and apparatus for predicting a fracture configuration associated with a fracture of a subsurface formation during stimulation of the subsurface formation based on a change such as movement detected by the one or more downhole sensors and/or surface sensors. Conventional prediction requires that measurement data associated with one or more sensors of the subsurface formation be collected over a period of time, inverted using an inversion process to form one or more models, and the measurements compared to the one or more models to identify a model which would best describe the fracture configuration for the fracture that formed during the period of time. Instead of having to perform such steps, the fracture configuration may be determined using an iterative extended Kalman filter which is modified to account for non-linearities in a model associated with the fracturing process. The iterative extended Kalman filter is an algorithm that uses a series of measurements observed over time, containing statistical noise and other inaccuracies, to produce estimates of unknown variables. In particular, the modified extended Kalman filter disclosed herein may predict the fracture configuration of fracture the subsurface formation in real time based on the measurements indicative of change of the subsurface formation provided by the one or more sensors. Further, the fracture configuration may be updated as additional measurements are received.

Figure 2:
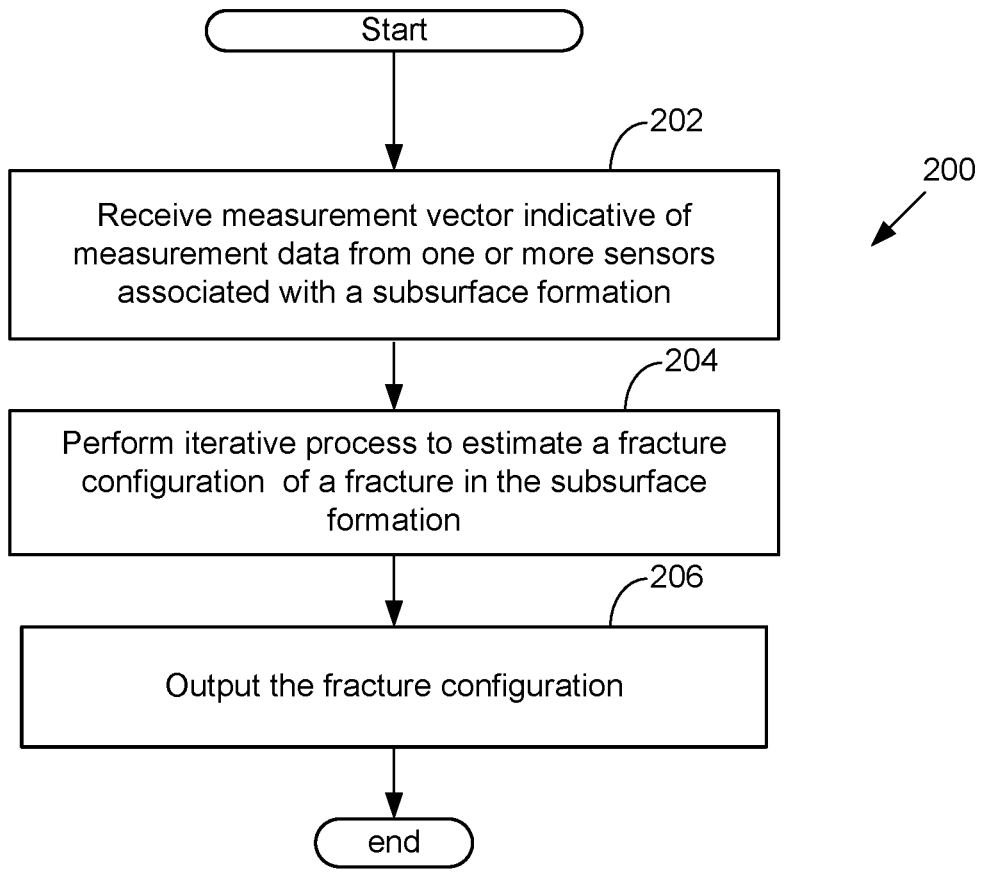
FIGS. 2, 3A, and 3B depict flowcharts associated with an illustrative process for determining the fracture configuration.

FIG. 2 illustrates an example flow diagram 200 for determining a fracture configuration of a subsurface formation. Briefly, at 202, a measurement vector $z_k$ may be received indicative of measurement data from one or more sensors associated with the subsurface formation (where each time instance is represented by a variable k). At 204, a modified iterative extended Kalman gain process may be used to estimate a fracture configuration of a fracture in the subsurface formation. At 206, the fracture configuration of a fracture associated with the subsurface formation may be output. The functions may be performed by the data processing system of FIG. 1.

The flow diagrams herein are provided to aid in understanding the illustrations and are not to be used to limit scope of the claims. In general, the flow diagrams depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Referring back, at 202, a measurement vector $z_k$ may be received. The measurement vector may include measurements from the one or more sensors associated with the subsurface formation. The measurements may take a variety of forms. For example, the measurements may include a tilt output by one or more tilt meters. As another example, the measurement may include a location of a fracture initiation point, e.g., an entry point from the well casing to the subsurface formation. As yet another example, the measurement may include a net pressure in the subsurface formation as indicated by a pressure sensor and an amount of treatment fluid pumped into the wellbore.

It should be noted that the various measurement data in the examples above are provided for illustrative purposes only and that embodiments of the present disclosure are not intended to be limited thereto. For example, the measurements of the measurement vector may include one or more real-time measurements of acoustic intensity, temporal heat (e.g., temperature), and micro-seismic data. It should also be noted that each of the above described measurements may be used independently or combined with one or more other measurements. A measurement may also be a parameter that is used to constrain a model associated with the fracturing process determined through a modeling process, but is not actually measured by a sensor. For example, the fracture lateral position could be added to the measurement vector to ensure the modeled fracture intersects the wellbore.

The fracturing of a subsurface formation may be governed by a non-linear difference equation. At 204, an iterative process may be performed to determine a fracture configuration of a fracture in the subsurface formation. The fracture configuration may be represented by a state vector $x_k$ comprising one or more state variables. The state vector may define the fracture configuration and be composed of one or more state variables. The state variable may be set based on the model of the fracturing process determined through the modeling process. The iterative process may be an iterative extended Kalman filter which is modified to account for the non-linearities in the model of the fracturing process.

The state variables may take various forms. As one example, a state variable may describe one or more characteristics of the fracture configuration such as a top depth indicative of a depth of the fracture from the surface of the formation where the fracture starts. As another example, a state variable may describe a bottom depth indicative a depth from the surface of the formation where the fracture ends. As yet another example, a state variable may describe a lateral length of the fracture. As another example, a state variable may describe a volume of the fracture and a pressure of treatment fluid in the fracture. As yet another example, a state variable may describe an offset of where the fracture begins from an initiation point, e.g., entry point, of the fracture. The state variable may take other forms as well illustrative of the fracture configuration.

The modified iterative extended Kalman filter may estimate the fracture configuration in the presence of non-linearities associated with the fracturing process. The estimate may involve updating the state vector based on the measurement vector and an estimate of the measurement vector weighted by a Kalman gain. The Kalman gain may indicate a level of "trust" between the measurement vector and the estimate of the measurement vector in updating the state vector. The Kalman gain may be calculated based on a Jacobian which indicates how a given measurement of the measurement vector changes as a given state variable of the state vector changes in the presence of non-linearities associated with the fracturing process. The determination of the Jacobian may involve identifying a global minimum associated with a nonlinear function that relates the measurement vector and the state vector. Further, in some embodiments, the Kalman gain K may be adjusted to ensure that the state variables associated with the state vector indicative of the fracture configuration are physically reasonable. For example, a length of a fracture cannot be less than zero.

At 206, the fracture configuration may be output. The fracture configuration may be used in a variety of ways. For example, the fracture configuration may be analyzed to determine whether to continue stimulation treatment. For example, if the top depth of the fracture is greater than a given depth from the surface, then the formation may continue to be stimulated since the top depth of the fracture may not meet the given depth indicative of a desired fracture configuration. Further, the stimulation process may be change based on the fracture configuration. The change may include adjusting at least one of a composition of the treatment fluid, a location where the treatment fluid is injected, and/or a pressure at which the treatment fluid is injected so that the desired fracture configuration is met. Alternatively, if the top depth of the fracture is less than the top depth, then the stimulation of the formation may stop since the top depth of the fracture meets the given criteria. As another example, the state vector may be output to a display which presents the state variables of the fracture configuration and/or graphically illustrates the fracture configuration in the subsurface formation based on the state variables.

Figure 3A:
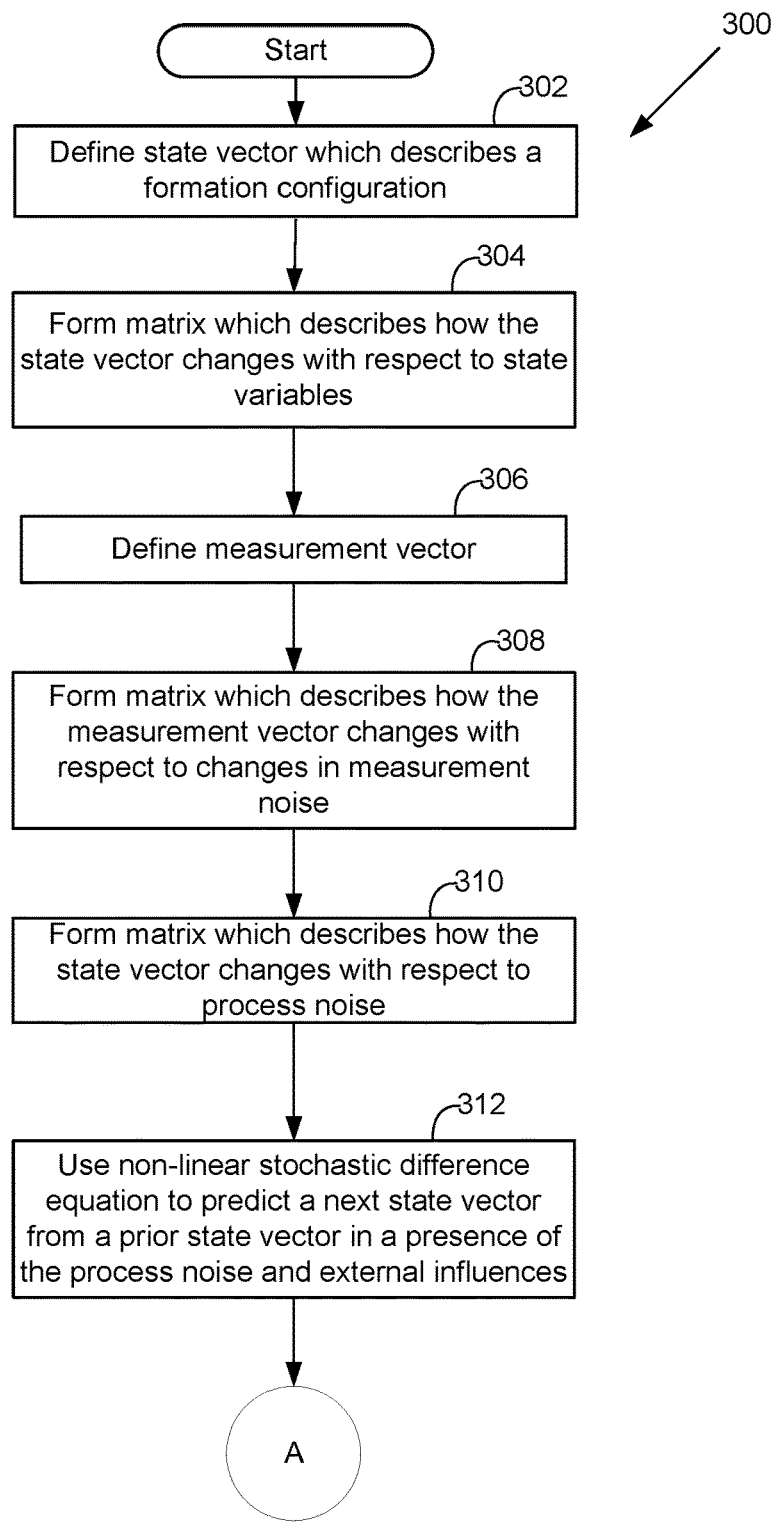
Figure 3B:
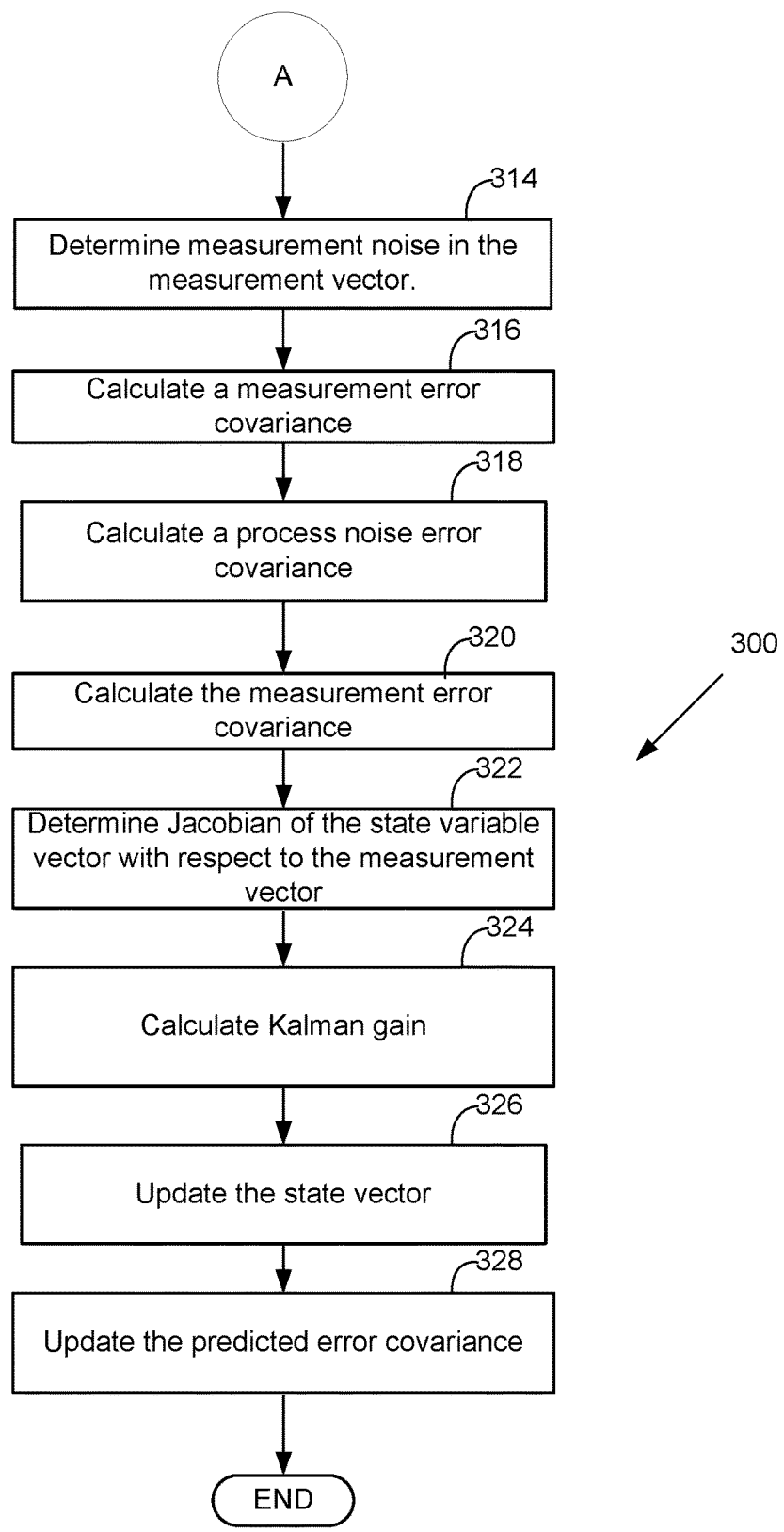

FIGS. 3A and 3B collectively illustrate an example flow diagram 300 which describes in detail the process for determining a fracture configuration in accordance with the modified iterative Kalman filter. FIGS. 3A and 3B illustrate a single flow with a transition between FIG. 3A and FIG. 3B represented as A. The process shown in FIGS. 3A and 3B may be performed, for example, by the data processing system of FIG. 1.

At 302, a state vector $x_k$ may be defined. The state vector $x_k$ may comprise one or more state variables associated with a fracture configuration of a fracture such that a plurality of state vectors may represent fracture configurations for a plurality of fractures. As noted above, a state variable may describe one or more characteristics of the fracture configuration such as a top depth of the fracture, a bottom depth of the fracture, a lateral length of the fracture, a volume of the fracture and a pressure of hydraulic fluid in the fracture, an offset of the fracture from an initiation point, e.g., entry point, of the fracture, among others. The state variable may take other forms illustrative of the fracture configuration.

At 304, a matrix A may be formed which describes how the state vector $x_k$ changes with respect to changes in the state variables. The changes may be described by a non-linear stochastic difference equation. The difference equation may predict a next state vector $x_k$ from a prior state vector $x_{k-1}$ in a presence of process noise $w_{k-1}$ and external influences $u_{k-1}$.

$$x_k = f(x_{k-1}, u_{k-1}, w_{k-1})$$

Typically, the function f may be determined by conducting various measurements of fracturing in a subsurface formation and modeling the fracturing process as the non-linear stochastic difference equation, e.g., fracture model. In some cases, the model may be a plurality of models. Process noise $w_{k-1}$ is an indication of how the state vector changes over time due to uncertainties in an environment which cannot be predicted. For example, treatment fluid may be pumped into a formation, but the state vector may not change as expected due to some treatment fluid being absorbed by the formation due to the formation being porous. In some examples, the process noise may take the form of Gaussian white noise with a normal probability. The external influences $u_k$ may include factors which influence the state vector. Treatment fluid pumped into the formation may be an example of such an external influence. An injection pump may be arranged to inject treatment fluid into a wellbore of the geological formation to stimulate fracturing of the geological formation. Further, as more fluid is injected into the formation, the fracture may grow while if less fluid is injected into the formation, the fracture may not grow or stop growing. The matrix A may take the form of a Jacobian matrix of first-order partial derivatives off with respect to each of the system state variables.

At 306, a measurement vector $z_k$ may be defined. The measurement vector may comprise measurements of varying types collected by the one or more sensors associated with the subsurface formation. A measurement may be a tilt output by the tilt meter from a given reference direction, e.g., vertical. Additionally, or alternatively, the measurement may identify a location where the fracture was initiated. This location may be determined based on flow distribution measurements which may indicate where fluid is flowing into the formation. Still additionally, or alternatively, the measurement may identify a pressure in the subsurface formation as indicated by a pressure sensor. Additionally, or alternatively, the measurement may identify an amount of treatment fluid pumped into the subsurface formation. The measurement vector $z_k$ may identify other measurements as well.

Measurement noise may be a signal received by a sensor when the wellbore is quiet, e.g., treatment fluid is not being injected in the well and there is no fracturing which is taking place. The measurement noise may be random fluctuations in the signal which affects measurements of the sensor. Ideally, the measurement noise may be zero. In some cases, the measurement noise may be modeled as a random variable in the form of Gaussian white noise with a normal probability.

A measurement vector $z_k$ may be related to the state vector $x_k$ and measurement noise $v_k$ by the function:

$$z_k = h(x_k, v_k)$$

where h is a nonlinear function which relates the measurement vector $z_k$ to the state vector $x_k$.

At 308, a matrix V may be formed which describes how the measurement vector $z_k$ changes with respect to changes in measurement noise $v_k$. The matrix may be a Jacobian matrix of first-order partial derivatives of h with respect to the measurement noise $v_k$ associated with each of the one or more sensors which collect measurement data.

At 310, a process matrix W may be formed which describes how the state vector $x_k$ changes with respect to the process noise $w_k$. The process matrix may be a Jacobian matrix of first-order partial derivatives off with respect to the process noise $w_k$.

At 312, the non-linear stochastic difference equation may be used to predict a state vector $x_k^-$ based on a prior estimate of the state vector $x_{k-1}$ in a presence of the process noise $w_{k-1}$ and external influences $u_{k-1}$. In this example, k may represent a current time interval while k−1 may represent an earlier time interval. In this regard, the state vector at time interval k may be based on the state vector predicted at time interval k−1 and the process noise and external influences at time interval k−1.

$$x_k^- = f(x_{k-1}, u_{k-1}, w_{k-1})$$

At 314, a determination is made as to measurement noise $v_k$ associated with each measurement data in the measurement vector. The measurement noise may be constant for a respective measurement in the measurement vector or vary based on a value of the measurement.

At 316, a calculation is made of a measurement error covariance P. The measurement error covariance may be an indication of how well one variable can be used to predict another variable. Specifically, one variable may be a state variable of the state vector $x_k$ and the other variable may be a given measurement of the measurement vector $z_k$. In this regard, the measurement error covariance may a sensitivity of a given measurement in the measurement vector to a given state variable of the state vector.

At 318, a determination is made as to a covariance of process noise Q. The process noise covariance may be an indication of how well one variable can be used to predict another variable. Specifically, one variable may be a state variable of the state vector $x_k$ and the other variable may be a process noise. In this regard, the process noise covariance may a sensitivity of a process noise to a given state variable of the state vector.

At 320, the measurement error covariance $P_k^-$ may be calculated to indicate an uncertainty in the state vector $x_k^-$ based on the noise. The calculation may be based on a measurement relationship that expresses this uncertainty and takes the form of a difference equation.

$$P_k^- = A P_{k-1} A_k^T + W_k Q_{k-1} W_k^T$$

The predicted state vector $x_k$ may be updated with the measurement vector $z_k$ to determine the state vector $x_k$ indicative of the fracture configuration. The update may involve calculating a Jacobian H which indicates how the measurement vector $z_k$ changes as a given state of the state vector $x_k$ associated with the fracture configuration changes in presence of non-linearities associated with the fracturing process.

At 322, the Jacobian H of the state variable vector with respect to the measurement vector $z_k$ may be determined. Function $h(x_k, 0)$ associated with a non-linear process may have one or more local minima and a global minimum. The Jacobian H may be based on the global minimum associated with h. A gradient may be identified which slopes in a direction toward a global minimum between an estimated measurement vector defined by $h(x_k^-, 0)$ and the measurement vector $z_k$. within a range of values of a given state variable of the state vector $x_k^-$. The range may be determined by placing reasonable limits on each state variable of the state vector $x_k^-$. For instance, state variables might not be less than zero, and might not be significantly greater than a largest value obtained from the model associated with the fracturing process based on reasonable but extreme values input into the model. Other variations are also possible.

Figure 4:
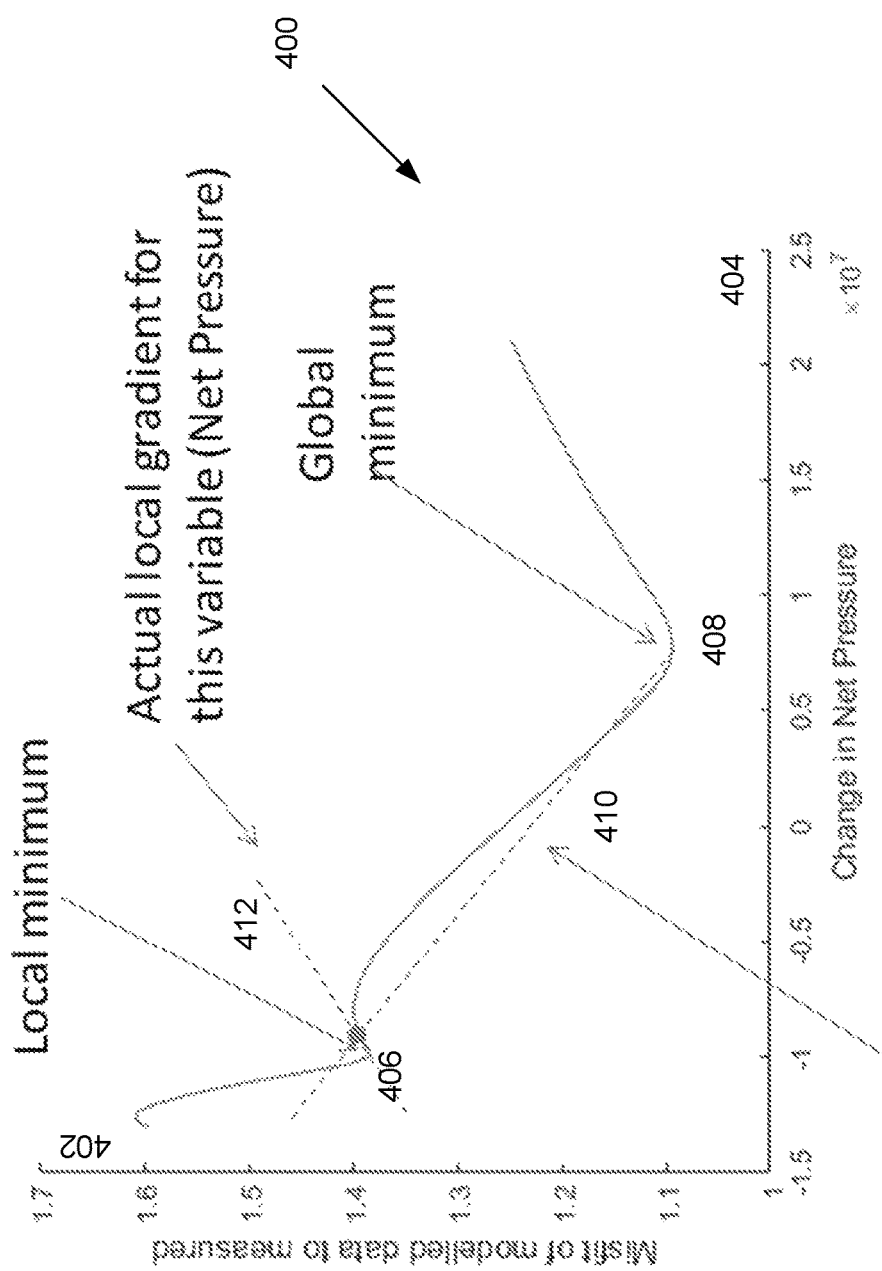
FIG. 4 shows a plot for determining a Jacobian of a state vector with respect to a measurement vector in determining the fracture configuration.

FIG. 4 is an example illustration 400 for determining this gradient. The example illustration 400 plots a misfit between the measurement vector $z_k$ and an estimate of the measurement vector provided by $h(x_k^-, 0)$ on a y-axis 402 as a function of different values of a given state variable on an x-axis 404 while other state variables of $x_k$ remain constant. The example illustration 400 shows the plot with respect to the state variable of net pressure which varies on the x-axis 404 but the plot could be with respect to other state variables. The misfit may be calculated in many ways. For instance, the misfit may be a vector norm between $z_k$ and the estimate of the measurement vector provided by $h(x_k^-, 0)$ which is plotted on the y axis 402. The misfit may take other forms as well.

The plot may have local minima 406 as well as a global minimum 408. Presence of one or more local minima and a global minimum associated with the function $h(x_k^-, 0)$ may be due to the fracturing being a non-linear process. The state variable associated with the predicted state vector $x_k^-$ may have an example value. This is shown as a net pressure change of $-1 \times 10^7$ in the plot. A misfit for the value of net pressure may also be identified in the plot, as shown by the dot at 406. The determination of H may involve identifying a gradient 410 which points to the global minimum 408 rather than a gradient 412 that points to the local minimum shown as point 406 in the plot. This way the iterative extended Kalman gain is able to estimate the state vector $x_k$ in a presence of non-linearities in the fracturing process.

Figure 5:
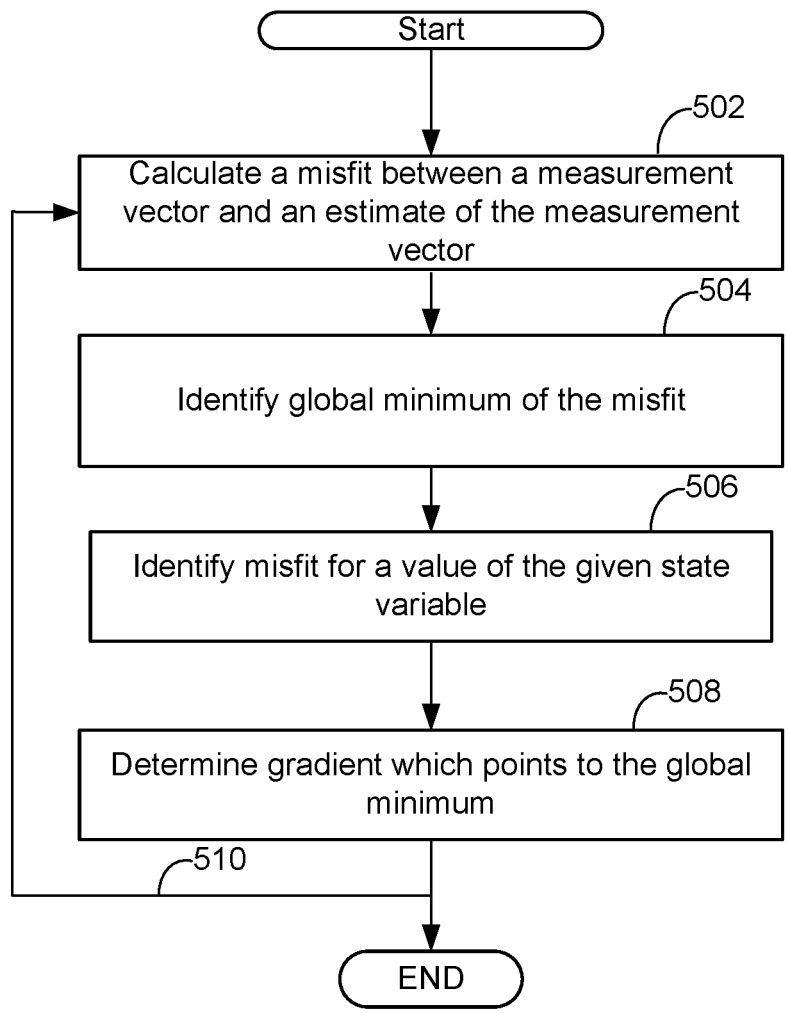
FIG. 5 depicts a flowchart for determining a gradient associated with the Jacobian.

FIG. 5 shows a process 500 for identifying the gradient 412. At 502, a misfit is calculated between the measurement vector $z_k$ and an estimate of the measurement vector provided by $h(x_k^-, 0)$ determined over a range of values of the given state variable of the state vector $x_k^-$. In this example, the given state variable is net pressure. At 504, a global minimum of the misfit is identified from a plurality of local minima. The global minimum may be a value of the misfit which is the smallest over the range of values of the given state variable. At 506, a misfit associated with the change of value of the given state variable of the state vector $x_k^-$ is identified. The change of value is shown as $-1 \times 10^7$ in the example of FIG. 4 and the misfit is 1.4. At 508, a gradient 412 which points to the global minimum may be determined based on the point 406 and the global minimum 408. The gradient may be calculated as a difference between the misfit at the global minimum and the misfit at the change of value associated with the given state variable of the state vector $x_k^-$ divided by a difference between the change of value associated with the given state variable of state vector $x_k^-$ and the change of value of the given state variable at the global minimum. As an example, the gradient for the plot shown in FIG. 4 may be calculated as:

Gradient=$(1.1-1.4)/(0.75+1)) \times 10^7$

At 510, this process may be repeated for each state variable of $x_k^-$ while holding other state variables constant. H may be populated based on the determined gradient associated with each state variable.

Referring back to FIGS. 3A and 3B, at 324, a Kalman gain K may be calculated. The Kalman gain K may be an amount of overlap between the estimate of the measurement vector and the measurement vector. The Kalman gain may be described by the following equation:

$$K_k = P_k^- H_k^T (H_k P_k^- H_k^T + V_k R_k V_k^T)^{-1}$$

At 326, the state vector $x_k$ may be updated based on the measurement vector $z_k$, the predicted state vector $x_k^-$, the estimate of the measurement vector determined based on $h(x_k^-, 0)$, weighted by the Kalman gain.

$$x_k = x_k^- + K_k(z_k - h(x_k^-, 0))$$

The Kalman gain is used to compute an a posteriori state estimate of the state vector $x_k$ as a linear combination of an a priori estimate $x_k^-$ and a weighted difference between the measurement vector $z_k$ as determined by sensor measurements (an actual measurement) and a estimate of the measurement vector $h(x_k^-, 0)$. The difference is called the measurement innovation, or the residual. The residual reflects the discrepancy between the estimate of the measurement and the actual measurement. A residual of zero means that the two are in complete agreement. The Kalman gain may be the weighting. The weighting may indicate how much to trust the actual measurement vector to the estimate of the measurement vector in updating the state vector $x_k$. Another way of thinking about the weighting by the Kalman gain is that as the measurement error covariance approaches zero, the actual measurement is "trusted" more and more, while the estimate of the measurement is trusted less and less. On the other hand, as the predicted error covariance approaches zero the actual measurement is trusted less and less, while the estimate of the measurement is trusted more and more.

In some examples, values of the Kalman gain K may be adjusted to ensure that the state variables associated with $x_k$ are physically reasonable. For example, the values of the Kalman gain associated with a state variable of fracture length may be adjusted so that resulting fracture length is greater than zero. To achieve this one or more of values of K may be adjusted. Then, $x_k$ may be calculated to determine if state variables are physically reasonable. If not, the one or more values of K may be adjusted again until the state variables of $x_k$ are physically reasonable. In some cases, the Kalman gain K may take the form of a matrix with one or more rows and a row of K (or portion thereof) may be adjusted so that the state variables associated with $x_k$ are physically reasonable At 328, the predicted error covariance may be updated in accordance with the following equation:

$$P_k = (I - K_k H_k) P_k^-$$

where I is an identity matrix.

Steps at 318 to 328 may be repeated until the predicted measurement vector and the actual measurement vector are within a given threshold of each other. For example, each measurement data of the actual measurement vector $z_k$ and the corresponding measurement data of the estimate of the measurement vector determined by $h(x_k, 0)$ is compared. For instance, a vector norm is calculated. If the vector norm is less than a given threshold, then the state vector $x_k$ may be output. If the vector norm of the difference is greater than a given threshold, then processing may return to 318 to further refine the state vector $x_k$.

The steps 302-328 may also be repeated when a new measurement vector $z_k$ is received with new measurements. This way the state vector $x_k$ and associated fracture configuration may be refined as additional measurements are received.

Figure 6:
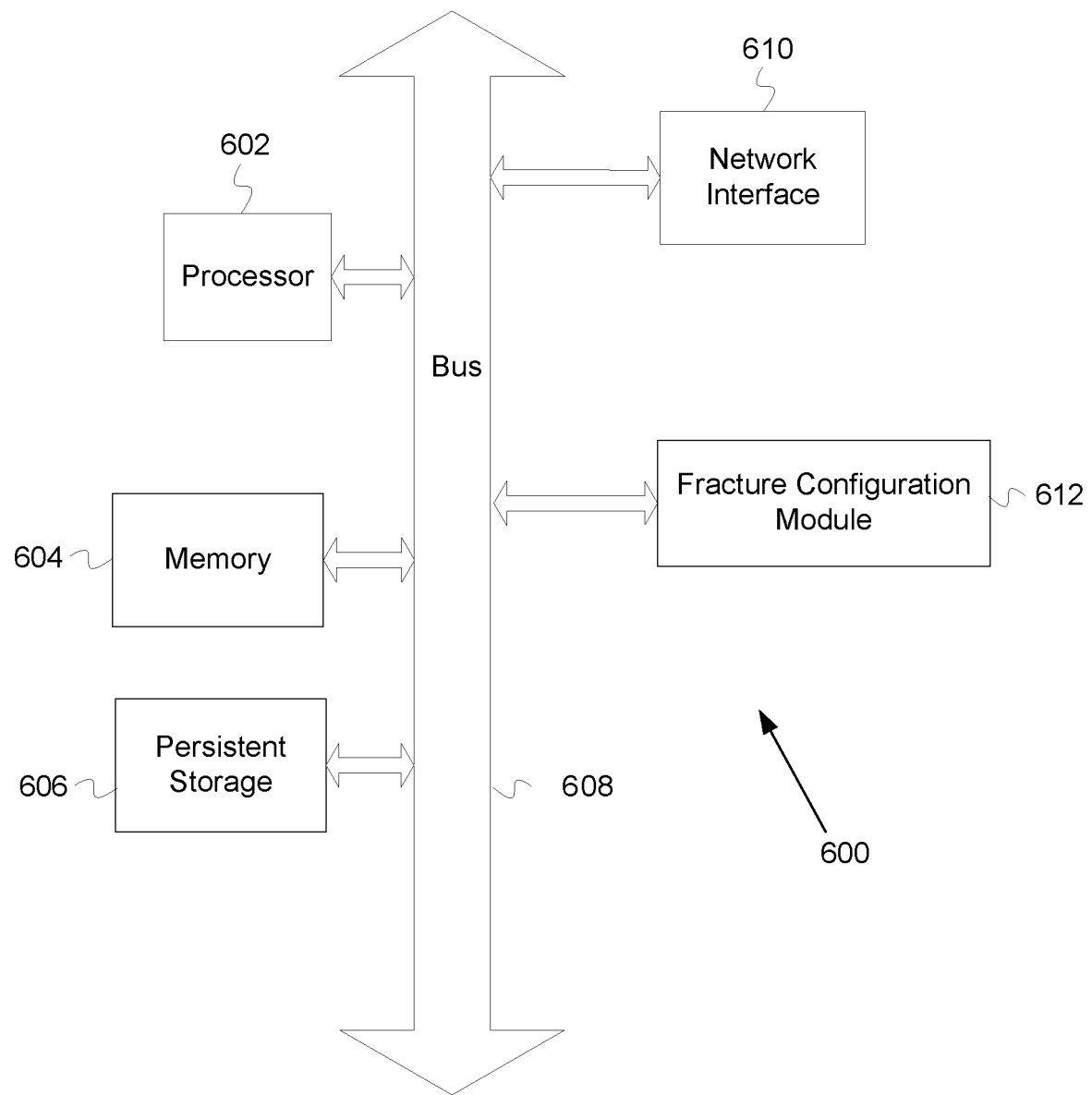
FIG. 6 depicts an example computer for determining the fracture configuration according to some embodiments.

FIG. 6 is a block diagram of the data processing system. The data processing system may take the form of a computer system 600. The computer system 600 may be located at a surface of a formation or downhole. In the case that the computer system 600 is downhole, the computer system 600 may be rugged, unobtrusive, can withstand the temperatures and pressures in situ at the wellbore.

The computer system 600 includes a processor 602 (possibly including multiple processors, multiple cores, multiple nodes, and/or implementing multi-threading, etc.). The computer device includes memory 504. The memory 604 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer system also includes a persistent data storage 606. The persistent data storage 606 can be a hard disk drive, such as magnetic storage device. The computer device also includes a bus 608 (e.g., PCI, ISA, PCI-Express, HyperTransport® bus, InfiniBand® bus, NuBus, etc.) and a network interface 610 in communication with the downhole and/or surface sensors. The computer system 600 may have a fracture configuration module 612 to determine the one or more state variables which collectively describe a fracture configuration of a fracture in a subsurface formation. The fracture configuration provided by the fracture configuration module 612 may be used to determine whether stimulation treatment should stop or continue depending on whether the fracture configuration meets certain criteria. For example, if the fracture configuration does not meet certain criteria, e.g., the length of the fracture is smaller than the criteria then additional treatment fluid may be injected into the wellbore. The additional treatment may be injected at a different pressure, at a different rate, with additional particulates, and/or with a different fluid chemistry to cause additional fracturing. In some cases, the particulates may be larger and/or at a higher concentration than in the treatment fluid previously used in the stimulation of the subsurface formation. As another example, if the fracture configuration does meet certain criteria, e.g., the length of the fracture is equal to or larger than the criteria then additional treatment fluid may not be injected into the wellbore and the stimulation process may stop a given stage of the well. Other variations are also possible.

The fracture configuration may be used in other ways as well, including providing user feedback of the fracture configuration on a display screen, for example.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any non-transitory tangible medium that can contain, or store a program for use by or in connection with an instruction execution system, apparatus, or device. A machine-readable storage medium is not a machine-readable signal medium.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for determining a fracture configuration of a fracture in a subsurface formation may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Additional embodiments can include varying combinations of features or elements from the example embodiments described above. For example, one embodiment may include elements from three of the example embodiments while another embodiment includes elements from five of the example embodiments described above.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Example embodiments include:

Embodiment 1

A method comprising: injecting treatment fluid into a wellbore of a geological formation to stimulate fracturing of the geological formation; receiving a plurality of measurements from one or more sensors on a surface of the geological formation or downhole which measure an indication of change in the geological formation based on the injection; determining a fracture configuration of a fracture in the geological formation based on a Kalman gain and the plurality of measurements; and adjusting the injection of the treatment fluid into the wellbore based on the fracture configuration.

Embodiment 2

The method of Embodiment 1, wherein the one or more sensors includes at least one of a tiltmeter on the surface of the geological formation for measuring tilt of the geological formation from a vertical position, an acoustic sensor, a pressure sensor, a micro-seismic sensor, and a temperature sensor.

Embodiment 3

The method of Embodiment 1 or 2, wherein the fracture configuration identifies a plurality of fracture parameters, wherein a given fracture parameter of the fracture configuration comprises one of a top depth of the fracture, a bottom depth of the fracture, and a lateral length of the fracture.

Embodiment 4

The method of any of Embodiments 1-3, wherein determining the fracture configuration comprises adjusting the Kalman gain to limit the given fracture parameter of the fracture configuration to a predetermined range.

Embodiment 5

The method of any of Embodiments 1-4, wherein the Kalman gain is a matrix with one or more rows of values; and wherein adjusting the Kalman gain comprises adjusting a given row of values of the matrix of the Kalman gain.

Embodiment 6

The method of any of Embodiments 1-5, wherein a Jacobian associated with the Kalman gain is based on identifying a global minimum associated with a nonlinear function that relates the plurality of measurements to the fracture configuration.

Embodiment 7

The method of any of Embodiments 1-6, wherein a Jacobian associated with the Kalman gain is based on a gradient which slopes in a direction toward a global minimum between an estimated plurality of measurements and the plurality of measurements over a range of values associated with a fracture parameter.

Embodiment 8

The method of any of Embodiments 1-7, wherein a state vector defines the fracture configuration and the Jacobian associated with the Kalman gain is further based on a Jacobian of the state vector with respect to a given measurement of the plurality of measurements.

Embodiment 9

The method of any of Embodiments 1-8, wherein the global minimum is based on a vector norm between the estimated plurality of measurements and the plurality of measurements.

Embodiment 10

The method of any of Embodiments 1-9, wherein determining the fracture configuration comprises repeating the determination of the fracture configuration each time another plurality of measurements is received from the one or more sensors.

Embodiment 11

One or more non-transitory computer readable media comprising program code, the program code to: in response to injection of treatment fluid into a wellbore of a geological formation to stimulate fracturing of the geological formation, receive a plurality of measurements from one or more sensors on a surface of the geological formation and downhole which measure an indication of change in the geological formation based on the injection; determine a fracture configuration of a fracture in the geological formation based on a Kalman gain and the plurality of measurements; and adjust the injection of the treatment fluid into the wellbore based on the fracture configuration.

Embodiment 12

The one or more non-transitory computer readable media of Embodiment 11, wherein the fracture configuration identifies a plurality of fracture parameters, wherein a given fracture parameter comprises one of a top depth of the fracture, a bottom depth of the fracture, and a lateral length of the fracture.

Embodiment 13

The one or more non-transitory computer readable media of Embodiment 11 or 12, wherein the program code to determine the fracture configuration comprises program code to adjust the Kalman gain to limit the given fracture parameter to a predetermined range.

Embodiment 14

The one or more non-transitory computer readable media of any of Embodiments 11-13, wherein the Kalman gain is a matrix with one or more rows of values; and wherein the program code to adjust the Kalman gain comprises program code to adjust a given row of values of the matrix of the Kalman gain.

Embodiment 15

The one or more non-transitory computer readable media of any of Embodiments 11-14, wherein a Jacobian associated with the Kalman gain is based on a gradient which slopes in a direction toward a global minimum between an estimated plurality of measurements and the plurality of measurements over a range of values associated with a fracture parameter.

Embodiment 16

The one or more non-transitory computer readable media of any of Embodiments 11-15, wherein a state vector defines the fracture configuration and the Jacobian associated with the Kalman gain is further based on a Jacobian of the state vector with respect to a given measurement of the plurality of measurements.

Embodiment 17

The one or more non-transitory computer readable media of any of Embodiments 11-16, wherein the program code to determine the fracture configuration comprises program code to repeat the determination of the fracture configuration each time another plurality of measurements is received from the one or more sensors.

Embodiment 18

The one or more non-transitory computer readable media of any of Embodiments 11-17, wherein the program code to adjust the injection comprises program code to adjust a pressure, injection rate, fluid chemistry or size of particulates in the treatment fluid which is injected into the wellbore.

Embodiment 19

A system comprising: a sensor arranged to measure an indication of movement of a geological formation at a surface of the geological formation or downhole of the geological formation based on stimulation of the geological formation; an injection pump to inject treatment fluid into a wellbore of the geological formation to stimulate fracturing of the geological formation; a processor; and a machine-readable medium having program code executable by the processor to cause the processor to: receive, from the sensor, the indication of movement in the geological formation based on the stimulation; and determine a fracture configuration of a fracture in the geological formation based on a Kalman gain and the indication of movement, wherein injection of the treatment fluid into the wellbore is adjusted based on the fracture configuration.

Embodiment 20

The system of Embodiment 19, wherein a Jacobian associated with the Kalman gain is based on identifying a global minimum associated with a nonlinear function that relates the plurality of measurements to the fracture configuration.

What is claimed is:

1. A method comprising:
   injecting treatment fluid into a wellbore of a geological formation to stimulate fracturing of the geological formation;
   receiving a plurality of measurements from one or more sensors on a surface of the geological formation or downhole which measure an indication of change in the geological formation based on the injection of the treatment fluid;
   determining a fracture configuration of a fracture in the geological formation based on a Kalman gain and the plurality of measurements; and
   adjusting the injection of the treatment fluid into the wellbore based on the fracture configuration.

2. The method of claim 1, wherein the one or more sensors includes at least one of a tiltmeter on the surface of the geological formation for measuring tilt of the geological formation from a vertical position, an acoustic sensor, a pressure sensor, a micro-seismic sensor, and a temperature sensor.

3. The method of claim 1, wherein the fracture configuration identifies a plurality of fracture parameters, wherein a given fracture parameter of the fracture configuration comprises one of a top depth of the fracture, a bottom depth of the fracture, and a lateral length of the fracture.

4. The method of claim 3, wherein determining the fracture configuration comprises adjusting the Kalman gain to limit the given fracture parameter of the fracture configuration to a predetermined range.

5. The method of claim 4, wherein the Kalman gain is a matrix with one or more rows of values; and wherein adjusting the Kalman gain comprises adjusting a given row of values of the matrix of the Kalman gain.

6. The method of claim 1, wherein a Jacobian associated with the Kalman gain is based on identifying a global minimum associated with a nonlinear function that relates the plurality of measurements to the fracture configuration.

7. The method of claim 1, wherein a Jacobian associated with the Kalman gain is based on a gradient which slopes in a direction toward a global minimum between an estimated plurality of measurements and the plurality of measurements over a range of values associated with a fracture parameter of the fracture configuration.

8. The method of claim 7, wherein a state vector defines the fracture configuration and the Jacobian associated with the Kalman gain is further based on a Jacobian of the state vector with respect to a given measurement of the plurality of measurements.

9. The method of claim 7, wherein the global minimum is based on a vector norm between the estimated plurality of measurements and the plurality of measurements.

10. The method of claim 1, wherein determining the fracture configuration comprises repeating the determination of the fracture configuration each time another plurality of measurements is received from the one or more sensors.

11. One or more non-transitory computer readable media comprising program code, the program code to:
    in response to injection of treatment fluid into a wellbore of a geological formation to stimulate fracturing of the geological formation, receive a plurality of measurements from one or more sensors on a surface of the geological formation and downhole which measure an indication of change in the geological formation based on the injection of treatment fluid;
    determine a fracture configuration of a fracture in the geological formation based on a Kalman gain and the plurality of measurements; and
    adjust the injection of the treatment fluid into the wellbore based on the fracture configuration.

12. The one or more non-transitory computer readable media of claim 11, wherein the fracture configuration identifies a plurality of fracture parameters, wherein a given fracture parameter comprises one of a top depth of the fracture, a bottom depth of the fracture, and a lateral length of the fracture.

13. The one or more non-transitory computer readable media of claim 12, wherein the program code to determine the fracture configuration comprises program code to adjust the Kalman gain to limit the given fracture parameter to a predetermined range.

14. The one or more non-transitory computer readable media of claim 11, wherein the Kalman gain is a matrix with one or more rows of values; and wherein the program code to adjust the Kalman gain comprises program code to adjust a given row of values of the matrix of the Kalman gain.

15. The one or more non-transitory computer readable media of claim 11, wherein a Jacobian associated with the Kalman gain is based on a gradient which slopes in a direction toward a global minimum between an estimated plurality of measurements and the plurality of measurements over a range of values associated with a fracture parameter of the fracture configuration.

16. The one or more non-transitory computer readable media of claim 15, wherein a state vector defines the fracture configuration and the Jacobian associated with the Kalman gain is further based on a Jacobian of the state vector with respect to a given measurement of the plurality of measurements.

17. The one or more non-transitory computer readable media of claim 11, wherein the program code to determine the fracture configuration comprises program code to repeat the determination of the fracture configuration each time another plurality of measurements is received from the one or more sensors.

18. The one or more non-transitory computer readable media of claim 11, wherein the program code to adjust the injection comprises program code to adjust a pressure, injection rate, fluid chemistry or size of particulates in the treatment fluid which is injected into the wellbore.

19. A system comprising:
a sensor arranged to measure an indication of movement of a geological formation at a surface of the geological formation or downhole of the geological formation based on stimulation of the geological formation;
an injection pump to inject treatment fluid into a wellbore of the geological formation to stimulate fracturing of the geological formation;
a processor; and
a machine-readable medium having program code executable by the processor to cause the processor to:
receive, from the sensor, the indication of movement in the geological formation based on the stimulation; and
determine a fracture configuration of a fracture in the geological formation based on a Kalman gain and the indication of movement, wherein injection of the treatment fluid into the wellbore is adjusted based on the fracture configuration.

20. The system of claim 19, wherein a Jacobian associated with the Kalman gain is based on identifying a global minimum associated with a nonlinear function that relates the plurality of measurements to the fracture configuration.

* * * * *